Jan. 13, 1942.  R. M. SHERRILL  2,269,790
CLAMP
Filed Aug. 31, 1938
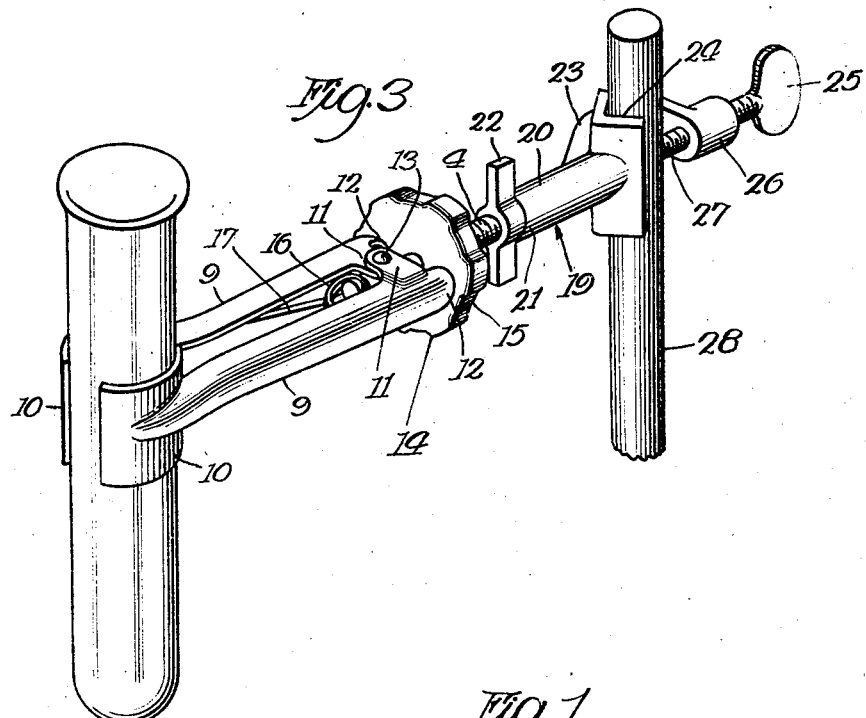
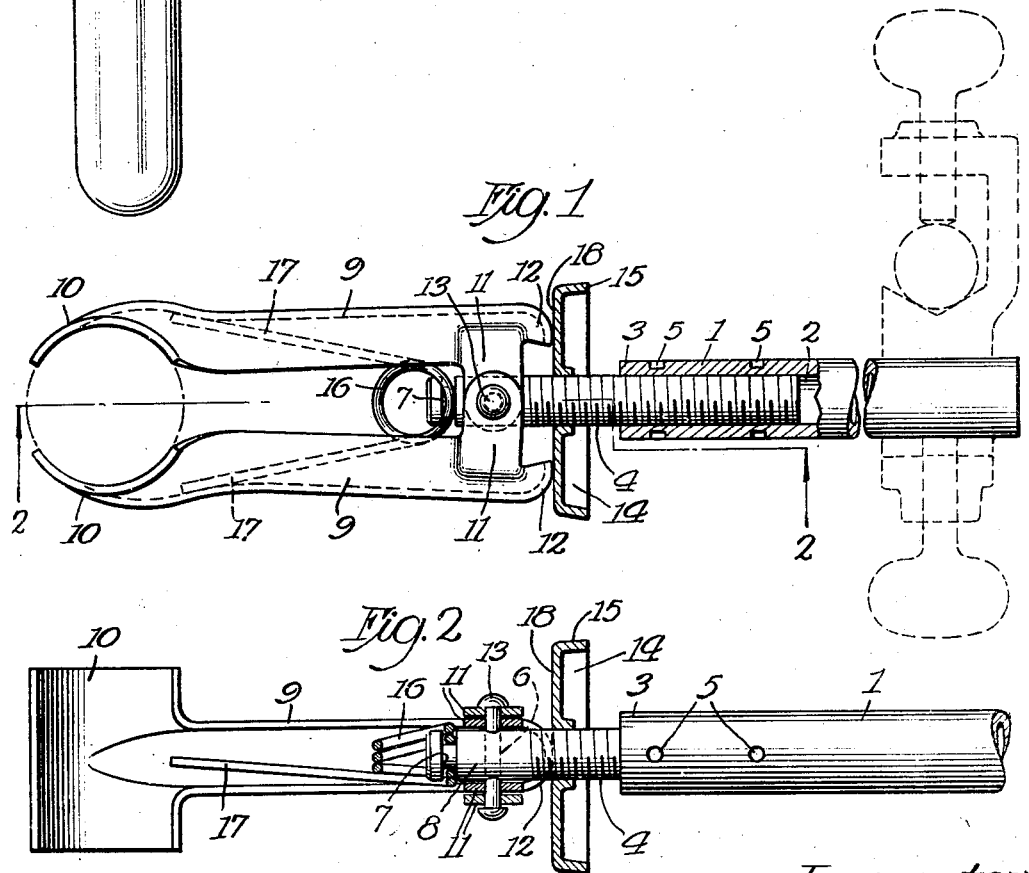
Inventor
Richard M. Sherrill
By Mann, Brown and Cox Attys.

Patented Jan. 13, 1942

2,269,790

UNITED STATES PATENT OFFICE 2,269,790

CLAMP

Richard M. Sherrill, Evanston, Ill., assignor to Central Scientific Co., a corporation of Illinois Application August 31, 1938, Serial No. 227,823

3 Claims. (Cl. 24—252)

Burette clamps or, more generally, clamps used in laboratories for holding tubular devices, as heretofore constructed, are illustrated on page 144 of Catalog No. J136 of the Central Scientific Company of Chicago. It is characteristic of these clamps that they are constructed with one fixed and one movable arm, and that the axis of the fixed arm is in line with the axis of the support rod or supporting member of the clamp. As a result, such a clamp does not open and close symmetrically; also the axis of the burette, or other tubular device being supported, does not pass through the axis of the support rod or supporting member of the clamp. This makes it difficult to line up the burette and also has a consequence that the weight of the burette produces a torque which tends to twist the clamp in its holder and makes it difficult to keep the burette aligned vertically.

Another undesirable feature of the clamps heretofore used is that by means of the wing nut or screw arrangement, it is easily possible to clamp the burette too tightly, resulting in a strain and breakage.

In view of these difficulties with the older type of burette clamp, the present invention has for its objects: To produce a burette clamp which will open and close symmetrically; to produce a burette clamp which will hold the burette so that its axis passes through the axis of the support rod or supporting member of the clamp; to provide an adjustment mechanism for the clamp which has rapid action and yet will not be apt to produce an excessive pressure on the burette; and to combine these desirable features in the form of clamp which will be convenient and inexpensive to manufacture.

Further and other objects and advantages will appear from the following description taken in connection with the accompanying drawing, in which—

Fig. 1 is a plan view of a burette clamp constructed in accordance with this invention, with a rod as the supporting member of the clamp;

Fig. 2 is a section along the line 2—2 of Fig. 1 of a portion of the burette clamp of Fig. 1;

Fig. 3 is a perspective view of a clamp similar to that of Fig. 1 except that instead of a support rod, it has a swivel support clamp as the supporting member.

In the burette clamp shown in Figs. 1 and 2, a support rod 1 has an opening 2 drilled and tapped in the end 3 to receive a threaded stud 4, which is then secured by peening at the points 5, 5. The stud is threaded for a portion of its length beyond the end 3 of the support rod 1, and has a rivet hole 6, as well as an annular groove 7, on the unthreaded portion 8. Two hollow clamping arms 9, 9, which are formed of sheet metal, carry cylindrical jaws 10, 10 at one end and projections 11, 11 and ball pivots 12, 12 at the other. They are pivoted by means of a rivet 13 through the hole 8 and corresponding holes in the projections 11, 11. A flat, threaded nut 14, with coarse knurling or corrugations on its outer rim 15, travels on the threaded portion of the stud 4 projecting beyond the end 3 of the support rod 1 and engages the spherically rounded portions 12, 12 on the ends of the arms 9, 9. A phosphor bronze spring 16 bent as shown, is inserted into the circular groove 7 and exerts a pressure on the interior of the hollow arms 9, 9 by means of the straight portions 17, 17 urging the arms 9, 9, apart until the rounded portions 12, 12 contact the flat surface 18 of the nut 14. It will be seen that with this arrangement, a travel of the nut 14 outward will close the jaws 10, 10, and clamp the object to be held; while a travel of the nut 14 inward will let the spring 16 come into play to open the jaws 10, 10.

The clamping arms 9, 9 and the nut 14 can be stamped from sheet metal, while the stud 4 and support rod 1 can be made in a screw machine, and the assembly consists in simply hooking the spring 16 into the circular groove 7, screwing on the nut 14, inserting the end of the stud 4 into the rod 1 and securing it by peening at the points 5, 5 and attaching the arms 9, 9 by means of the rivet 13. It will be seen from this that the device can be manufactured very conveniently and inexpensively.

The burette clamp shown in perspective in Fig. 3 and mounted on a tripod base stand is similar in all respects to that shown in Figs. 1 and 2, except that the support rod 1 is replaced by a swivel support clamp 19. The latter consists of: A straight portion 20, drilled and tapped at a shoulder or end 21 to receive the stud 4, which is secured by the straight wing nut 22; a curved arm 23 carrying a V groove 24 on its inner side; and a thumb screw 25 at its outer end 26. The V groove 24 and the end 27 of the thumb screw 25 cooperate to fasten the support clamp 19 to the upright rod 28 of a tripod stand, which comprises an upright rod 28 screwed into the center of the tripod base (not shown). By loosening the wing nut 22, the burette clamp can be rotated about its axis, thus enabling the device held by the burette clamp to be set at various angles to the vertical.

One outstanding advantage of this invention which particularly commends the clamp for use by laboratory workers, is the fact that the clamp can very easily be manipulated, and although the action of the nut 14 on the threaded stud 4 is referred to in this specification and the appended claims as "slow motion means," in reality, the clamp is characterized by the rapidity with which the burette, test tube, or other apparatus, can be clamped into place and released. Furthermore, the action of the adjusting mechanism is such that when the jaw arms 17 are wide apart, the nut 14 when advanced along the threaded shank 4 causes the arms to move toward each other more rapidly than when the arms are close together.

The pressure of the pivots 12 against the face 18 of the nut is sufficient to always maintain the clamp in adjusted position.

Throughout the appended claims, the expression "burette clamp" is intended to include all types of clamps used for supporting laboratory apparatus, or similar articles.

Various modifications will occur to those skilled in the art, and the appended claims should, therefore, be interpreted as broadly as the prior art will permit.

I claim:

1. A burette clamp comprising a supporting member, a stud having a threaded and an unthreaded portion, a nut traveling on the threaded portion of the stud, a pair of clamping arms pivotally supported on the unthreaded portion of the stud and movable towards and away from each other about a common axis, a spring also mounted on the unthreaded portion of the stud at a point spaced from said common axis for urging the arms apart, and a rounded portion associated with the clamping arms engaging the surface of the nut and cooperating with it for forcing the arms together.

2. In a burette clamp, a supporting member adapted to be secured to a supporting structure, a threaded intermediate portion upon the support, a manually operated nut upon the threaded portion, an end portion on said member receiving the pin and having a circumferential groove, a pair of clamping arms pivotally mounted upon the pin and having a shoulder portion engaged by said nut in drive and release relationship, a curled spring supported on said end portion as held in place in the groove and having resiliently spreading extensions urging the clamping arms apart and the shoulders against the nut.

3. A burette clamp comprising a supporting member, a stud carried by the supporting member and having a threaded portion and another portion beyond the threaded portion, a nut traveling on the threaded portion of the stud, a pair of clamping arms pivotally supported on said other portion of the stud and movable towards and away from each other, a spring also mounted on said other portion of the stud at a point farther removed from the supporting member than is the pivotal support for the clamping arms for urging the arms apart, and a rounded portion associated with the clamping arms engaging the surface of the nut and cooperating with it for forcing the arms together.

RICHARD M. SHERRILL.